United States Patent
Pittman et al.

(10) Patent No.: US 6,896,152 B2
(45) Date of Patent: May 24, 2005

(54) ELECTRONIC PLURAL COMPONENT PROPORTIONER

(75) Inventors: David M. Pittman, Brooklyn Park, MN (US); Adam R. Friedrich, St. Paul, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 10/204,936

(22) PCT Filed: Mar. 2, 2001

(86) PCT No.: PCT/US01/06904

§ 371 (c)(1),
(2), (4) Date: Aug. 27, 2002

(87) PCT Pub. No.: WO01/64325

PCT Pub. Date: Sep. 7, 2001

(65) Prior Publication Data

US 2003/0015547 A1 Jan. 23, 2003

Related U.S. Application Data

(60) Provisional application No. 60/186,405, filed on Mar. 2, 2000.

(51) Int. Cl.[7] ................................................ B01F 15/04
(52) U.S. Cl. ........................ 222/57; 222/63; 222/135; 222/145.5; 222/309
(58) Field of Search ........................... 222/57, 63, 135, 222/145.1, 145.5, 145.6, 309

(56) References Cited

U.S. PATENT DOCUMENTS

| | | | | |
|---|---|---|---|---|
| 3,653,545 A | * | 4/1972 | Tanner | 222/61 |
| 3,908,862 A | * | 9/1975 | Chandra et al. | 222/63 |
| 4,090,695 A | * | 5/1978 | Stone et al. | 222/63 |
| 4,275,822 A | * | 6/1981 | Juffa et al. | 222/63 |
| 4,279,360 A | * | 7/1981 | Hauser | 222/135 |
| 4,286,732 A | * | 9/1981 | James et al. | 222/135 |
| 4,494,676 A | * | 1/1985 | Berweger | 222/63 |
| 4,881,820 A | * | 11/1989 | Luckhoff | 222/135 |
| 5,605,252 A | * | 2/1997 | Owen et al. | 222/135 |
| 6,135,724 A | * | 10/2000 | Yoder et al. | 222/63 |

* cited by examiner

*Primary Examiner*—Kenneth Bomberg
(74) *Attorney, Agent, or Firm*—Douglas B. Farrow

(57) ABSTRACT

An electronic apparatus is provided for dispensing plural component materials having first and second (and optionally third) components and a desired ratio between the components. The apparatus has first and second reciprocating pumps (4), each of the pumps (4) being connected to a source of one of said components, first and second reciprocating drivers (5), each driver (5) being connected to drive one of the pumps and forming a driver-pump set, a position sensor (6) attached to each driver-pump set, each position sensor (6) outputting increments of resolution corresponding to a fixed volume being pumped by the driver-pump set to which it is connected, and a controller attached to the drivers and the position sensors to alternately move one of the driver-pump sets one said increment and the other of the driver-pump sets the product of one increment and the ratio.

3 Claims, 3 Drawing Sheets

ELECTRONIC PLURAL COMPONENT PROPORTIONER

RELATED APPLICATION

Provisional U.S. application Ser. No. 60/186,405, filed Mar. 2, 2000.

TECHNICAL FIELD

Mixing and dispensing apparatus for plural component materials.

BACKGROUND ART

As plural component materials such as paints and the like have become more popular and widespread in recent years, there has been an increasing desire on the part of users of such materials for better solutions to mix and dispense those materials. The traditional low technology way of using such materials is commonly known as hot potting. In hot potting, the user merely pours the desired amounts of the two (or more recently three) components into a container, mixes them and then sprays or otherwise applies the material to a substrate. In addition to the mess involved in doing so, such use often results in inaccurate mixing and wasted material as often the total amount of material mixed is not utilized.

Mechanical proportioners such as Graco's HYDRA-CAT® are suitable in such applications yet provide no monitoring functions and often lack flexibility in the ratios and the types of material that can be metered and applied. Electronic proportioners have become more popular in recent years but tend to be relatively more expensive due to the expensive fluid meters involved.

DISCLOSURE OF THE INVENTION

It is therefore an object of this invention to provide an electronic proportioner which may be produced relatively inexpensively and is more suited for lower end applications and yet which provides accurate metering and the ability to dispense two or three component materials with ratio assurance.

The invention is designed as a complete package to pump, pressurize, proportion, and dispense plural component paints and other materials. Individual material components (typically resin, catalyst and reducer also often referred to as components A, B and C) are supplied to simple reciprocating piston pumps through siphon hoses. The operation of the piston pumps are electronically and pneumatically controlled to pressurize and provide flow of the materials at the selected ratio through hoses attached to a mix manifold fluid pressure regulator. The materials combine at the mix manifold and pass through a length of hose to integrate the materials. A static mixer is used to thoroughly integrate and mix the materials. The mixed material is then dispensed from a spray gun and on to the substrate to be painted or coated. In the preferred embodiment, the package can supply from one to three individual components at ratios from 1:1(:1) to 8:1(:1). In situations where only one or two components will de dispensed, the control for the unused component(s) is(are) set to zero. The device also allows the user to dispense single and plural component paints on ratio and on demand without premixing the materials which significantly reduces the amount of wasted material.

The advantage of this design over existing designs of similar cost stem from the fact that the pumps are physically independent but electronically synchronized thus the ratios can cover a large range without any change in hardware. Fixed ratio mechanical proportioners require different size pumps to change ratio and variable ratio mechanical proportioners have a small range of ratio that can be achieved without replacing the pumps with different sized lowers. A ratio change procedure is slow because it involves a repetitive change and check procedure to get the ratio set to the target value. In the instant invention, the pumps can be run independently for actions such as flushing and priming. A mechanical proportioner with a ratio of 8:1 would typically waste 8 gallons of base to prime the catalyst pump and hoses. The electronic controller offers the capability of monitoring, shutting down, and giving the user a specific code if an error occurs. Such detectable errors can include pump over-travel (off ratio), position sensor failure, pump over-speed, ratio change during run or batch dispense, attempt to run when the ratio is set to zero and memory failure.

These and other objects and advantages of the invention will appear more fully from the following description made in conjunction with the accompanying drawings wherein like reference characters refer to the same or similar parts throughout the several views.

BEST MODE FOR CARRYING OUT THE INVENTION

Figure 1:
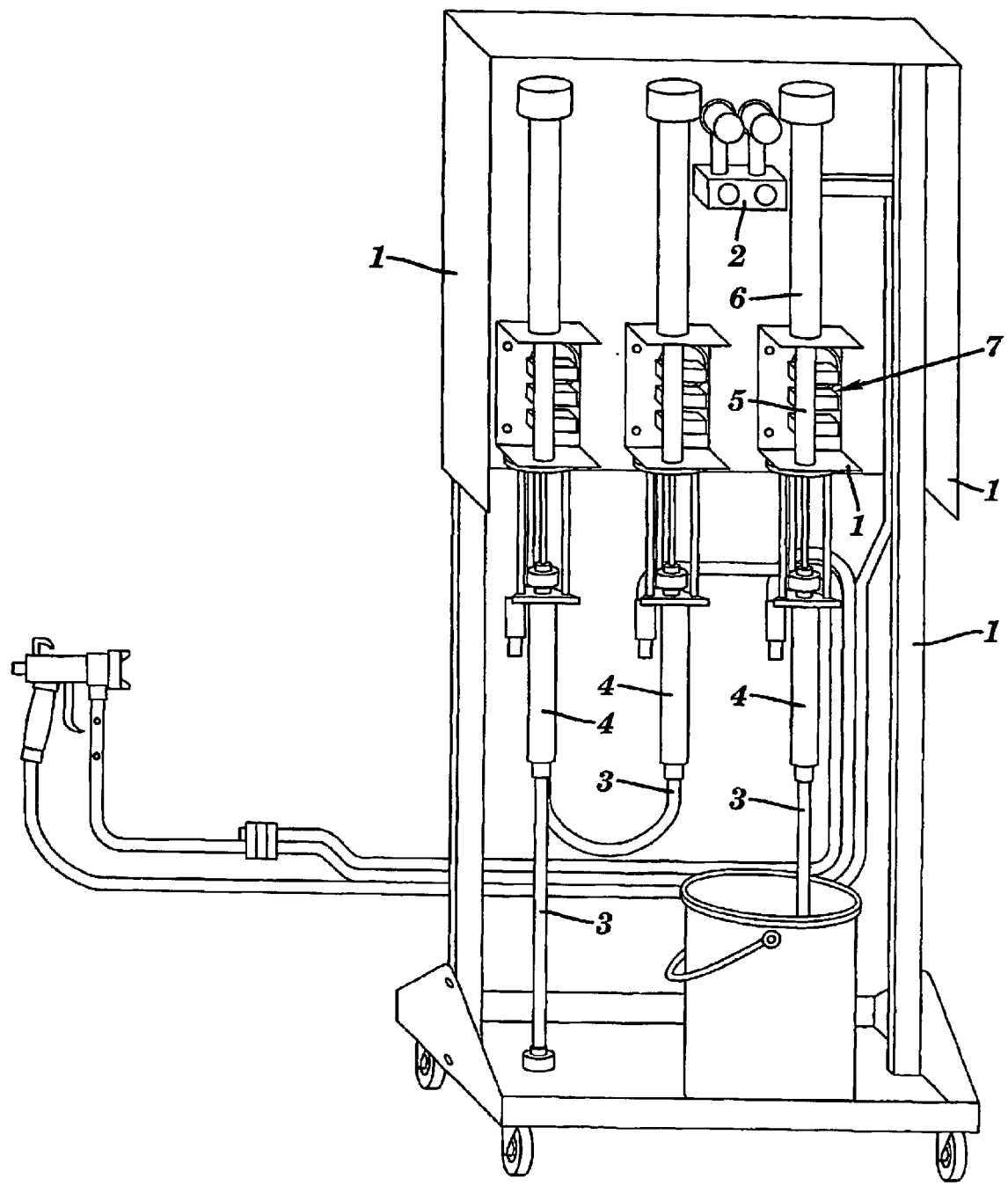
FIG. 1 is a rear view of the proportioner of the instant invention.
Figure 2:
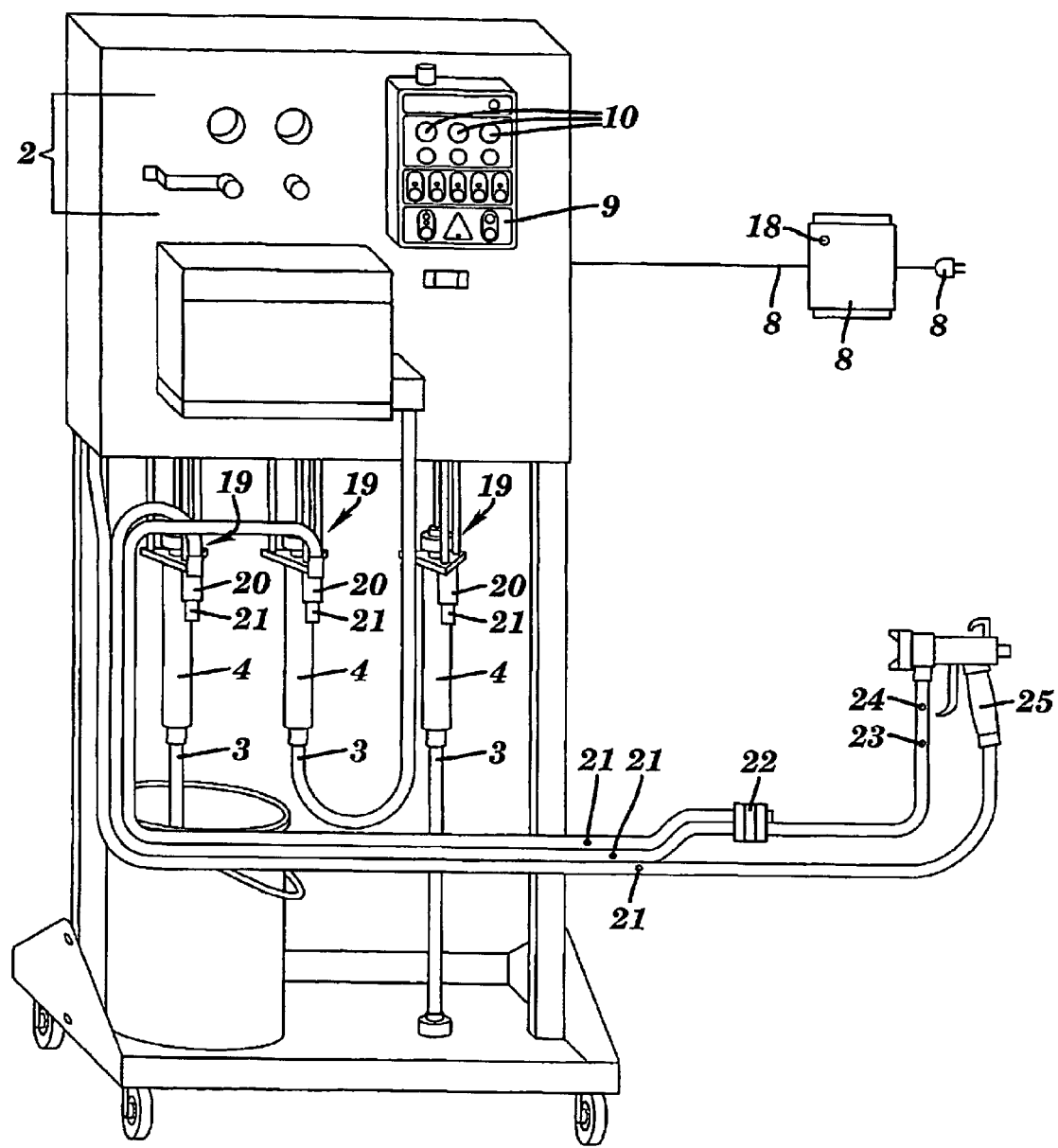
FIG. 2 is a front view of the proportioner of the instant invention.
Figure 3:
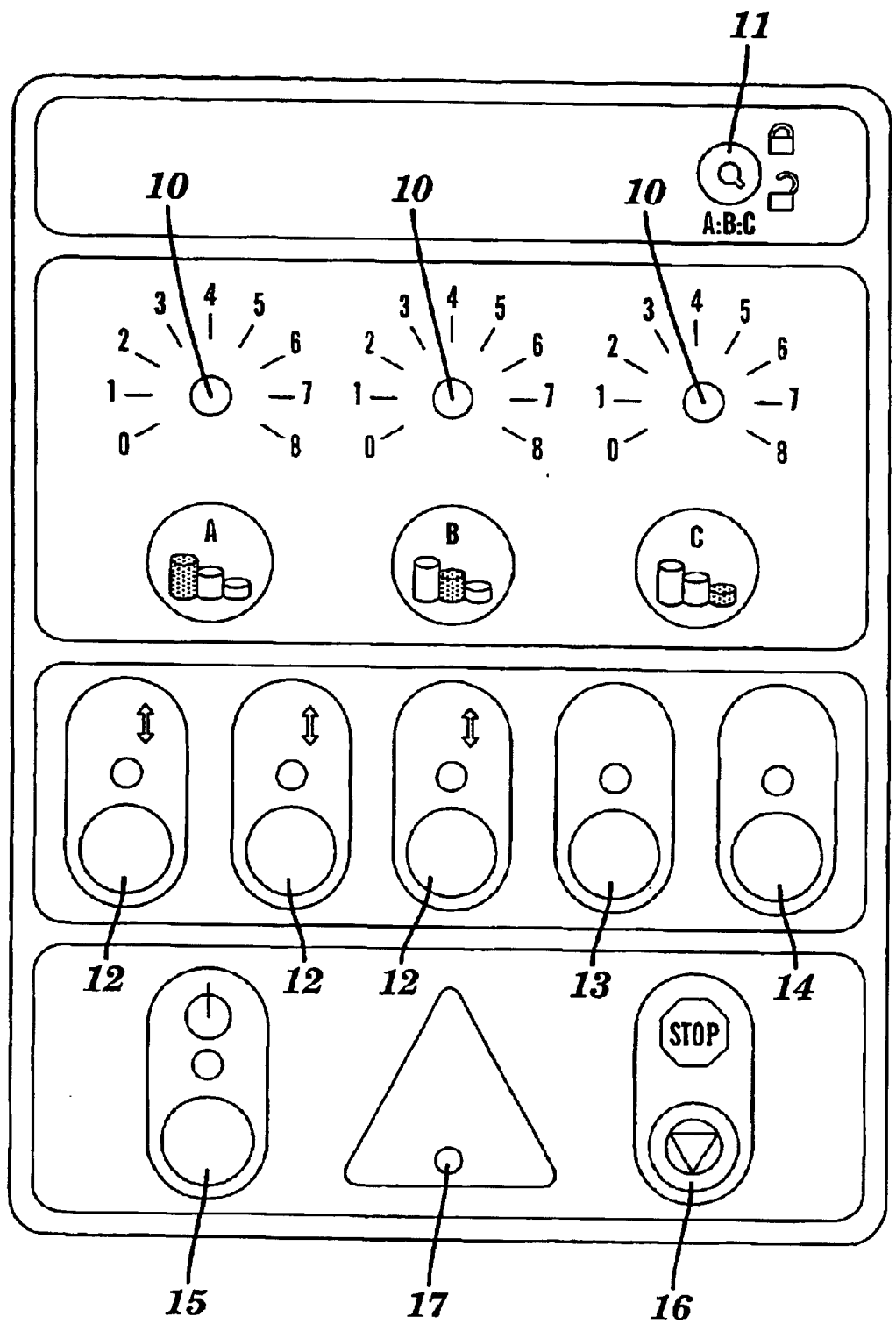
FIG. 3 is a view of the control panel of the instant invention.

The instant invention as shown in FIGS. 1 and 2 is generally comprised of a stand 1 having air controls 2 mounted thereon. Siphon hoses 3 are used to supply materials to the pumps from containers such as the bucket shown (but not numbered). Siphon tubes 3 are attached to the inlet of positive displacement reciprocating piston pumps 4 such as those manufactured by Graco Inc., the assignee of the instant invention.

Piston pumps 4 are powered by double acting air cylinders 5 of the type commonly known and manufactured by a variety of producers such as Bimba or American. Movement of the double acting air cylinders is sensed by pump position sensors 6. Sensors 6 are preferably magneto-restrictive position sensors such as those manufactured by MTS Systems Corporation.

The system is provided with a power assembly 8 comprised of a cord, power supply and intrinsically safe barrier. Electronic controller 9 is used to select the ratio. The three ratio select knobs 10 are used to select the ratio with a zero selection turning off that component or source. A ratio lock-out key 11 allows the user, or often the supervisor of the individual using the unit, to lock in a ratio preventing inadvertent or undesired adjustment of the ratio away from the desired setting. Pump independent function 12 allows running each individual pump in order to prime and flush out the system and for performing diagnostics. Pump test function 13 runs each individual pump to dispense equal amounts of fluid from the sample valves to verify the mechanical pump systems are performing properly. Batch dispense function 14 runs each individual pump to dispense a fixed total amount of fluid from the sample valves at the desired ratio. An example for use of this function might be that while normal production takes place by spraying from a spray gun 25 directly as shown in the drawings, touch-up work might be performed using a cup gun and the batch dispense allows dispensing of a small amount of fluid which can be used in the cup of the gun for touch-up work.

Run button 15 continuously runs the pumps in a sequential manner to dispense the materials at the selected ratio. Stop button 16 stops any function currently in operation. Error light 17 flashes a red light with a specific code when the controller detects an error. Power light 18 on the power supply indicates when power is supplied to the controller. Three-way fluid valves 19 allow directing fluid to the gun or to sampling orifices. Fluid sampling orifices 20 are provided for collecting samples. Air and fluid hoses 21 perform their respective functions (air is supplied to the double acting air cylinders while the fluid carries individual material components to the mix manifold 22 having an integral pressure regulator). Integrator hose 23 helps mix the material after the mix manifold in conjunction with typical static mixers 24 at the beginning and end of integrator hose 23 which is in turn connected to the inlet of a spray gun 25. (Air hose 21 also provides air to spray gun 25)

In operation, the components are dispensed sequentially similar to the system utilizing Graco's PRECISIONMIX product and described generally in European Patent Number EP0116879. If a two component material is being dispensed at 3:1, the "A" pump would dispense three increments (in the preferred embodiment an increment represents 0.1 inches of stroke travel for a dispense volume of 0.4526 cc) then one increment of "B" is dispensed and then the cycle repeats.

This system is designed so that the components of the mixed ratios must be integers so that if for instance a manufacture specifies a 2½:1 ratio, the user would select 5:2 on the control panel. Similarly for a three component material at, for example, 3:1:1, the "A" pump would dispense three increments, the "B" pump one increment, and the "C" pump one increment with the process thence repeating.

It is contemplated that various changes and modifications may be made to the proportioner without departing from the spirit and scope of the invention as defined by the following claims.

What is claimed is:

1. An apparatus for dispensing plural component materials under pressure having at least first and second components and a desired ratio between said components, said apparatus comprising:

first and second reciprocating pumps, each of said pumps having a stroke, an outlet and being connected to one of said components;

first and second reciprocating drivers, each driver being connected to drive one of said pumps and forming a driver-pump set;

a position sensor attached to each said driver-pump set, each said position sensor outputting increments of resolution corresponding to a fixed volume being pumped by the driver-pump set to which it is connected;

a mix manifold connected to said outlets; and a controller attached to said drivers and said position sensors alternately moving one of said driver-pump sets one said increment and the other of said driver-pump sets the product of one increment and said ratio.

2. The apparatus for dispensing plural component materials of claim 1 wherein said position sensors are magnetorestrictive.

3. The apparatus for dispensing plural component materials of claim 1 wherein said resolution increments are substantially less than said stroke.

* * * * *